(12) United States Patent
Ishikura et al.

(10) Patent No.: US 7,950,715 B2
(45) Date of Patent: May 31, 2011

(54) REAR SEAT PASSENGER DETECTION DEVICE

(75) Inventors: Masashi Ishikura, Utsunomiya (JP); Makoto Koike, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 319 days.

(21) Appl. No.: 12/202,792

(22) Filed: Sep. 2, 2008

(65) Prior Publication Data

US 2009/0057111 A1 Mar. 5, 2009

(30) Foreign Application Priority Data

Sep. 3, 2007 (JP) ................ P2007-227965

(51) Int. Cl.
*H01H 63/26* (2006.01)
(52) U.S. Cl. ................ 296/68.1; 200/5 A; 200/61.58 R
(58) Field of Classification Search ................ 200/180, 200/85 A
See application file for complete search history.

(56) References Cited

U.S. PATENT DOCUMENTS

| | | | |
|---|---|---|---|
| 6,300,869 B1 * | 10/2001 | White et al. | 340/457 |
| 6,460,934 B1 | 10/2002 | Langer et al. | |
| 7,358,473 B2 * | 4/2008 | Aoki et al. | 250/205 |
| 2004/0239183 A1 | 12/2004 | Delgado et al. | |
| 2010/0181061 A1 * | 7/2010 | Ozeki | 165/200 |

FOREIGN PATENT DOCUMENTS

| | | |
|---|---|---|
| DE | 3803602 A1 | 8/1989 |
| DE | 19629964 A1 | 1/1998 |
| JP | 1144259 U | 10/1989 |
| JP | 5-76912 U | 10/1993 |
| JP | 06206484 A | 7/1994 |
| JP | 06278574 A | 10/1994 |
| JP | 07156736 A | 6/1995 |
| JP | 2004-26003 | 1/2004 |
| JP | 2006117046 A | 5/2006 |
| JP | 2006219028 A | 8/2006 |

* cited by examiner

*Primary Examiner* — Renee S Luebke
*Assistant Examiner* — Lheiren Mae Caroc
(74) *Attorney, Agent, or Firm* — Arent Fox LLP (57) ABSTRACT

A rear seat passenger detection device comprising: a first switch which closes a contact thereof when a front seat door is opened; a second switch which closes a contact thereof when a seatback of a front seat corresponding to the front seat door is inclined and lowered to an angle with respect to a seat face equal to or less than a predetermined angle, and is connected in series with the first switch; and a control device which detects a passenger boarding in a rear seat when the first switch and the second switch are closed.

3 Claims, 7 Drawing Sheets

REAR SEAT PASSENGER DETECTION DEVICE

BACKGROUND OF THE INVENTION

Priority is claimed from Japanese Patent Application No. 2007-227965, filed Sep. 3, 2007, the contents of which are incorporated herein by reference.

FIELD OF THE INVENTION

The present invention relates to a rear seat passenger detection device for a vehicle or the like.

DESCRIPTION OF THE RELATED ART

Passenger detection devices which detect passengers seated in a front seat and a rear seat of a vehicle judge whether the passengers are seated in the seat based on detection results of seat sensors installed in the front seat and the rear seat. In such passenger detection devices, since expensive seat sensors are provided in each of the seats, the costs are increased. Hence in order to eliminate such seat sensors for rear seats, in recent years, rear seat passenger detection devices have been proposed which, when an opening and closing switch for a door to a rear seat changes from the ON state to the OFF state, judge that a passenger has been seated in the rear seat (see, for example, Japanese Unexamined Patent Application, First Publication No. 2004-26003).

The rear seat passenger detection devices such as that described above can be applied to vehicles with four or more doors including doors for rear seats; however, in the case of vehicles with two or three doors for example, it was impossible to detect whether passengers have been seated in the rear seats based on the ON or OFF state of door opening and closing switches. Hence in order to detect the seating of passengers in rear seats in a vehicle with two doors or three doors, a rear seat passenger detection device is proposed that an operation of a seat lever used to change the angle of the seatback of the driver's seat or front passenger's seat is detected, and it is judged that a passenger is seated in the rear seat when both operation of such levers and opening and closing of the door are detected.

Figure 5:
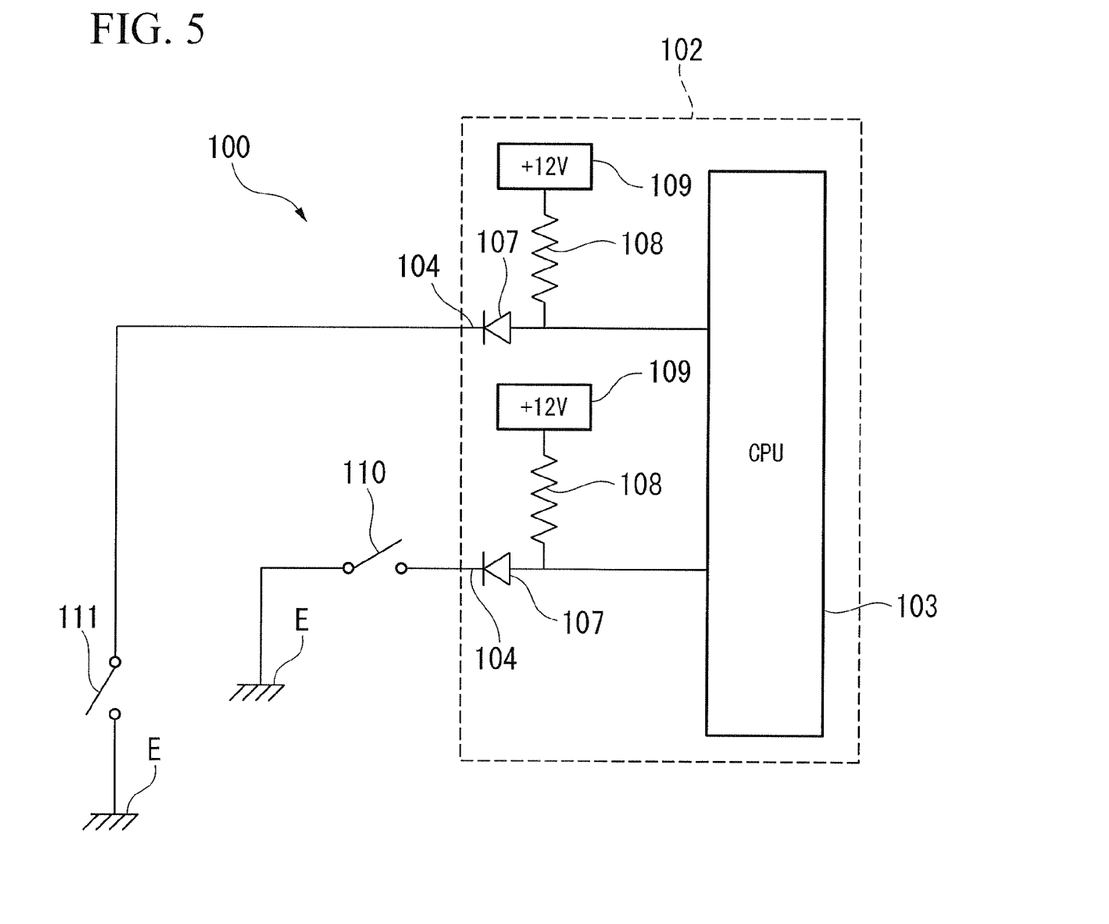
FIG. 5 is a schematic configuration diagram of a conventional rear seat passenger detection device.

As shown in FIG. 5, this rear seat passenger detection device 100 includes a seat switch 110 and a door switch 111. The seat switch 110 detects operation of a lever which is operated when the angle of the seatback of the driver's seat or front passenger's seat is changed. The door switch 111 detects opening and closing of the door to the driver's seat or to the front passenger's seat. The seat switch 110 and the door switch 111 are inserted between ground E and separate the input ports 104 connected to the CPU 103 of a vehicle electronic control unit 102. Diodes 107, 107 are inserted, with the forward direction toward ground E, between the seat switch 110 and input port 104 and between the door switch 111 and input port 104, respectively. Further, power supplies (+12 V) 109, 109 are branched and connected via resistors 108, 108 between the diodes 107, 107 and the CPU 103.

Figure 6:
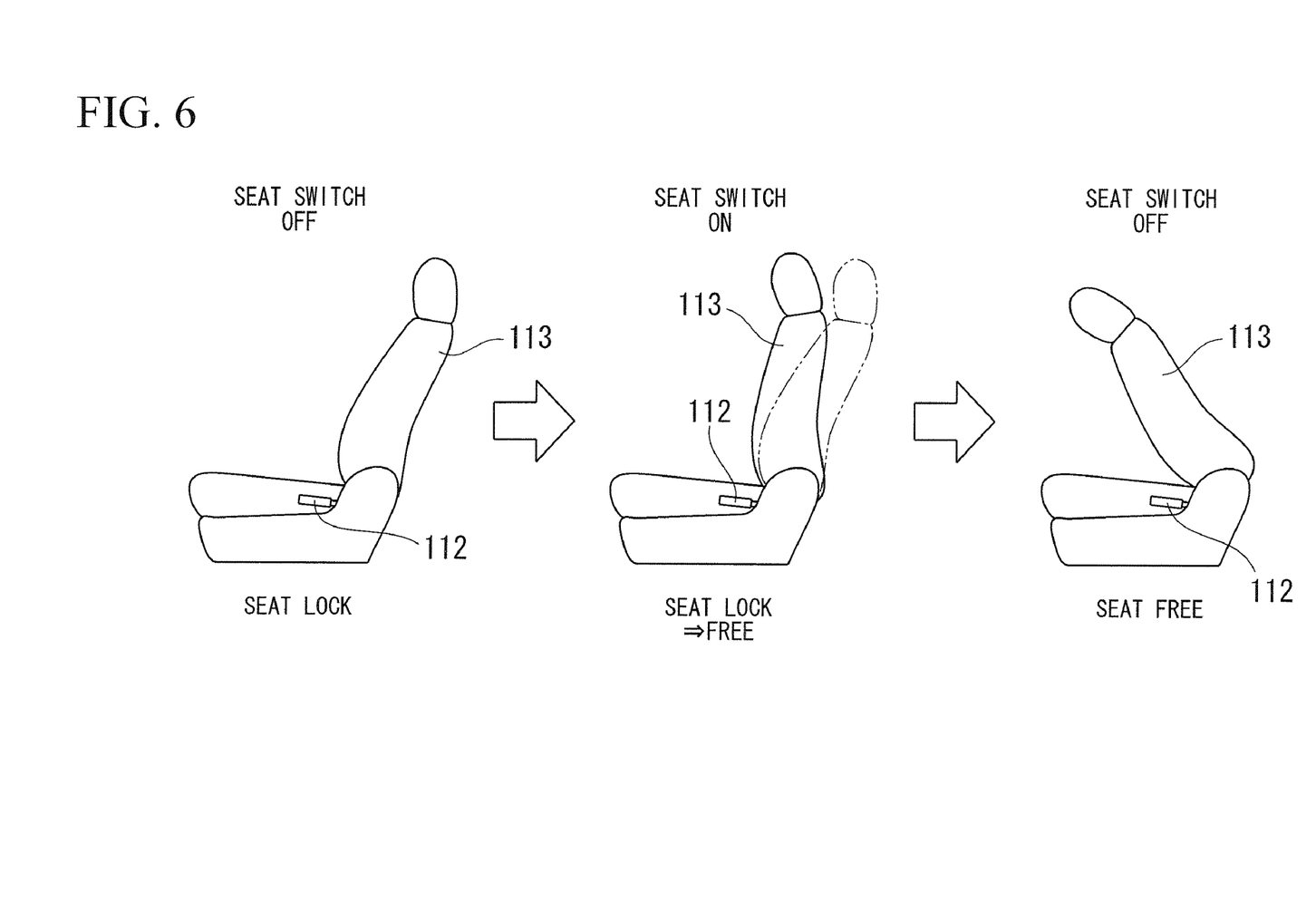
FIG. 6 is a diagram explaining ON/OFF switching timing of a seat switch of the prior art.

As shown in FIG. 6, the seat switch 110 is closed (ON) when for example the seat lever 112 is operated (from SEAT LOCK to FREE) from the state in which the seatback 113 is fixed (SEAT LOCK). In the state in which the seatback 113 is inclined and can move (SEAT FREE), when the operation of the seat lever 112 is stopped, even while the seatback 113 is inclined and moving, the seat switch 110 is opened (OFF).

On the other hand, the door switch 111 is closed when the door on the driver's side and on the front passenger's side is opened, and is opened when the door is closed.

When the seat switch 110 is closed, the electric potential of the input port 104 connected to the seat switch 110 changes from Hi (High) electric potential, which is the power supply voltage, to Lo (Low) electric potential, which is ground electric potential. When the door switch 111 is closed, the electric potential of the input port 104 connected to the door switch 111 changes from Hi to Lo. The CPU 103 detects changes in the electric potential at the respectively input ports 104, 104. When the electric potentials at both the input port 104 connected to the seat switch 110 and at the input port 104 connected to the door switch 111 are Lo, it is judged that a passenger is seated in a rear seat, and the driver is notified of this judgment.

However, in the case of the above-described rear seat passenger detection device, the seat switch 110 is closed only while the seat lever 112 is being operated in order to incline and move the seatback 113. As a result, when the operation time is too short, operation of the seat lever 112 cannot be detected by the CPU 103. Further, when the seat lever 112 is touched accidentally or in similar cases, although the seatback 113 is not inclined forward, operation of the seat lever 112 is detected by the CPU 103. As a result, there may be cases of erroneous judgment that a passenger is seated in a rear seat. Hence a seat switch which prevents such erroneous judgment has been proposed. In place of a seat switch 110 which detects operation of the seat lever 112, this seat switch, for example, detects the fact that the seatback 113 of the driver's seat and the front passenger's seat has been inclined forward and that the angle made by the seatback 113 and the seat cushion has become equal to or less than a predetermined angle.

Using the above-described circuit configuration, by detecting the inclination of the seatback 113, erroneous judgments can be prevented. However, when the seatback 113 is inclined forward, and is maintained in a state in which the angle with the seat cushion is equal to or less than the predetermined angle, current continues to flow from the power supply 109 to ground E via the resistor 108, diode 107, and the seat switch which detects the inclination of the seatback 113. As a result, there is the concern that the dark current is increased.

Hence an object of the present invention is to provide a rear seat passenger detection device which can reliably detect the seating of a passenger in a rear seat, while suppressing increases in cost of the rear seat passenger detection device and increases in the dark current.

SUMMARY OF THE INVENTION

The present invention employs the followings in order to achieve the above described object.

That is, a rear seat passenger detection device includes: a first switch which closes a contact thereof when a front seat door is opened; a second switch which closes a contact thereof when a seatback of a front seat corresponding to the front seat door is inclined and lowered to an angle with respect to a seat face equal to or less than a predetermined angle, and is connected in series with the first switch; and a control device which detects a passenger boarding in a rear seat when the first switch and the second switch are closed.

According to the above described rear seat passenger detection device, by detecting both the inclination of the front seatback and the opening of the front door without using a conventional seat sensors, a rear seat passenger can be detected. Therefore, there is the advantageous effect in that seating of the rear seat passenger can be detected reliably, while suppressing cost increases and preventing erroneous judgments.

Further, since the first switch and the second switch are connected in series, even in a state in which the seatback angle is maintained, when the front door is closed, the first switch will open. Hence in cases in which the inclination of the seatback is maintained, there is the advantageous effect of preventing the dark current from increasing.

It may be arranged such that the control device judges that the passenger has boarded in the rear seat when the first switch and the second switch are closed for a predetermined length of time or longer.

In this case, for example, when the state in which the door is opened and the seatback is inclined in order to enable the passenger to board on the rear seat is maintained for a predetermined time necessary to complete boarding, then it can be judged that the passenger has boarded on the rear seat. Hence in addition to the above-described advantageous effects, there is the further advantageous effect in that erroneous judgments can be prevented.

It may be arranged such that a third switch which closes a contact thereof when the front seat is displaced in a vehicle forward direction is included, wherein: the first switch, the second switch, and the third switch are connected in series; and the control device detects that the passenger has boarded in the rear seat when the first switch, the second switch, and the third switch are all closed.

In this case, by connecting the third switch, the contact of which closes when the front seat is displaced in the vehicle forward direction, in series against the first switch and the second switch, when the first, the second, and the third switches are all closed, boarding and seating of the passenger in a rear seat can be judged. Hence in addition to the above-described advantageous effects, erroneous judgments can be further prevented.

DETAILED DESCRIPTION OF THE INVENTION

An embodiment of a rear seat passenger detection device will now be described with reference to the drawings.

This rear seat passenger detection device is for a two-door or three-door vehicle, in which two passengers can board in a front row, while two or three passengers can board in a rear row, and in which only one door each is provided on each of the left-side portion and on the right-side portion of the vehicle to enable passengers to board. This rear seat passenger detection device includes similar detection circuits on the driver's seat (front seat) side and on the front passenger's seat (front seat) side of the vehicle, and so in this embodiment, only the detection circuit on the driver's seat side is explained, and an explanation of the detection circuit on the front passenger's seat side is omitted.

Figure 1:
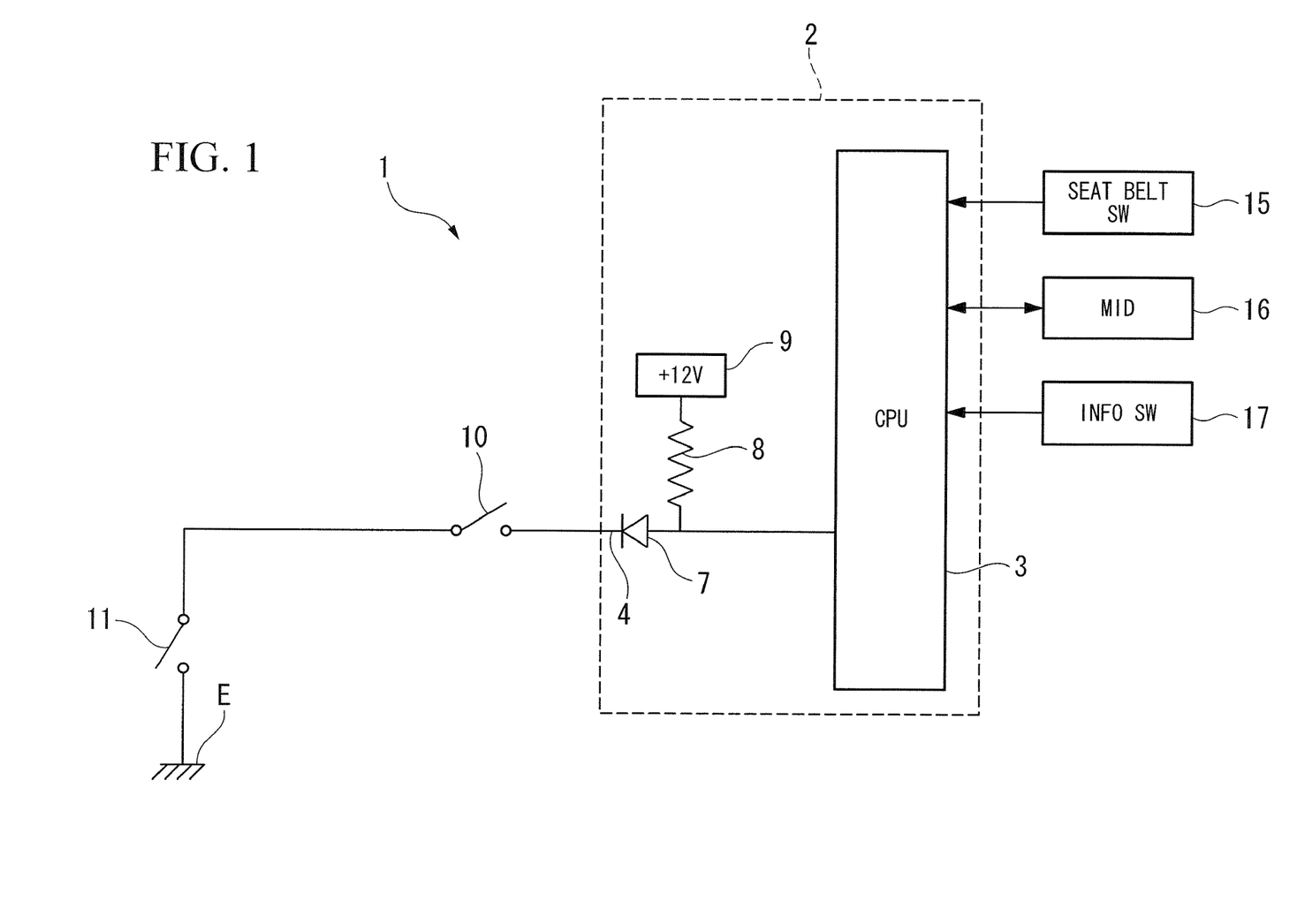
FIG. 1 is a schematic configuration diagram of a rear seat passenger detection device of an embodiment of the present invention.

FIG. 1 shows the circuit configuration of the rear seat passenger detection device 1 of this embodiment. As shown in FIG. 1, the rear seat passenger detection device 1 includes a control unit (control device) 2. This control unit 2 includes a CPU 3 as a computation device, and an input port 4 which passes signals from the outside to the CPU 3. The input port 4 of the control unit 2 is connected to a diode 7 which prevents reverse flow, in order to protect the CPU 3; between this diode 7 and the CPU 3 is connected a power supply (for example, +12 V) 9, via a resistor 8.

Figure 2:
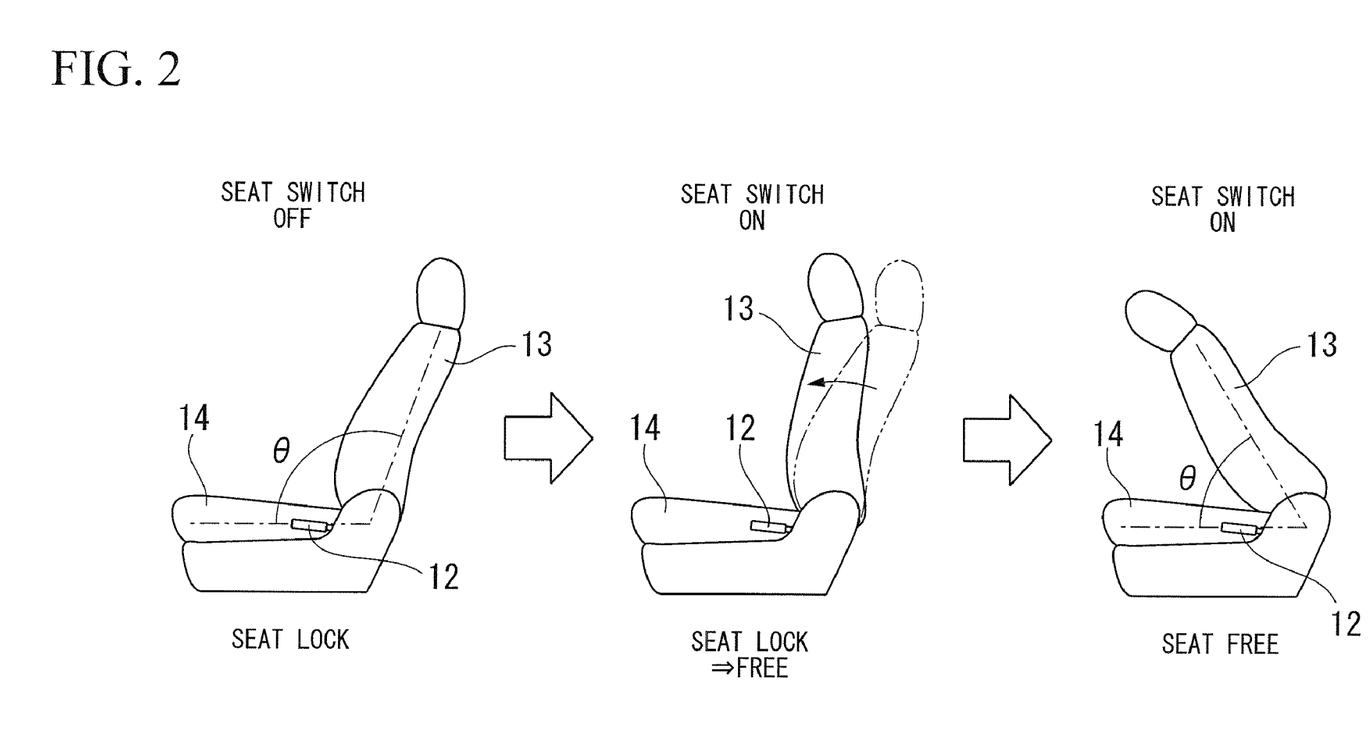
FIG. 2 is a diagram explaining ON/OFF switching timing of a seat switch of the rear seat passenger detection device.

Between the input port 4 and ground E are connected, in series, a seat switch 10 and a door switch 11. As shown in FIG. 2, when the operation lever 12 is operated and held, the seatback 13 of the driver's seat can be inclined forward-backward and moved. In this state, when the seatback 13 is inclined forward and the angle θ made by the seatback 13 and the seat cushion 14 becomes equal to or less than a predetermined angle, even when operation of the operation lever 12 is released, the seat switch 10 is maintained in the short-circuited state. That is, the seat switch 10 is a so-called normally-open type contact, and is short-circuited in the state in which the seatback 13 is inclined.

Here, the above-described predetermined angle is the minimum angle of inclination forward of the seatback 13 necessary when a passenger boards to be seated in the rear seat. As the switch which closes when the inclination angle becomes equal to or less than the predetermined angle, various types of switches can be used. Such switches can for example be rotary type or other switches in which an electrode position is displaced according to the inclination of the seatback 13, as well as switches which open and close according to a position sensor output.

The door switch 11 is a normally-open type contact which is short-circuited when the driver's side door (not shown) is opened. The door switch 11 is a generally contact used when displaying the door-open state on the meter panel.

That is, when the angle θ made by the seatback 13 and seat cushion 14 of the driver's seat becomes equal to or less than the predetermined angle, and moreover the driver's side door is opened, both the seat switch 10 and the door switch 11 are simultaneously short-circuited. The input to the input port 4 becomes the Lo signal which is at ground electric potential. On the other hand, when at least one among the seat switch 10 and the door switch 11 is open, the input to the input port 4 is maintained to the Hi signal which is the power supply voltage.

The CPU 3 is configured so as to execute a program stored in memory, not shown, and perform rear seat passenger detection processing. The CPU 3 detects the Hi or Lo state of the voltage signal at the input port 4, and when for example the Lo voltage signal has been input continuously to the input port 4 for a predetermined length of time (for example, approximately 3 seconds) or longer, judges that a passenger has boarded and is seated in a rear seat. Here, the predetermined time is a time which is preset as the minimum length of time necessary for a passenger to board on a rear seat.

The control unit 2 is connected to a seat belt switch 15, which detects the fastening of a seat belt buckle (not shown) provided in the rear seat on the driver's seat side with a tongue plate (not shown). Further, the control unit 2 is connected to a multi-information display (MID) 16, positioned in the instrument panel of the vehicle, which can display various types of vehicle information. The control unit 2 controls display by the multi-information display 16. The rear seat information display 20 displays notification of the seating of a passenger in the rear seat, and displays seat belt status indicating the state of the seat belt being fastened, based on detection results of the seat belt switch 15.

The control unit 2 is further connected to a display switch (INFO SW) 17 used to switch the display of the multi-information display 16. This display switch 17 is for example positioned in the steering wheel or the like. This display switch 17 is set such that, when pressed by a passenger, the control unit 2 switches in sequence the display contents of the multi-information display 16.

Figure 4:
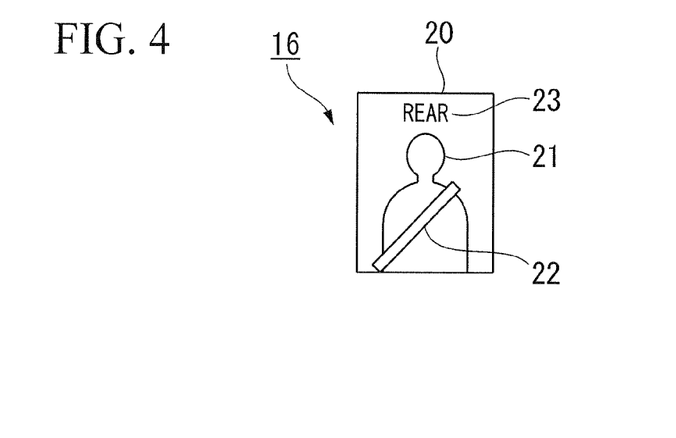
FIG. 4 is a front view of a rear seat information display of the rear seat passenger detection device.

FIG. 4 shows an example of a rear seat information display 20 displayed on the above-described multi-information display 16. Display or non-display of the passenger symbol 21, seat belt symbol 22, and characters "REAR" indicating the rear seat in this rear seat information display 20 are separately controlled by the CPU 3. In the multi-information display 16 shown in FIG. 4, a case is shown in which a passenger is seated in the rear seat, and moreover the seat belt is fastened. In FIG. 4, a case is shown in which the rear seat on the driver's seat side and the rear seat on the front passenger's seat side are not distinguished; however, the rear seat on the driver's seat side and the rear seat on the front passenger's seat side may be distinguished and displayed in the rear seat information display 20.

When the driver's side door is opened and the seatback 13 of the driver's seat is inclined and lowered in the forward direction, and the fact that the angle θ has become equal to or less than the predetermined angle is detected, then it can be judged that a passenger has boarded and is seated in the rear seat on the driver's seat side. On the other hand, when the front passenger's side door is opened and the seatback 13 of the front passenger's seat is inclined and lowered in the forward direction, and the fact that the angle θ has become equal to or less than the predetermined angle is detected, then it can be judged that a passenger has boarded and is seated in the rear seat on the front passenger's seat side. Hence when for example the seating capacity of the vehicle is four persons, the number of passengers seated in the rear seats can be detected by the CPU 3. Further, the number of passengers seated in the rear seats can also be detected according to the number of seat belts fastened. Based on the number of passengers detected in the rear seats, the CPU 3 can cause a informational of the number of passengers and whether seat belts have been fastened by passengers in rear seats to also be displayed by for example the rear seat information display 20 shown in FIG. 4.

Figure 3:
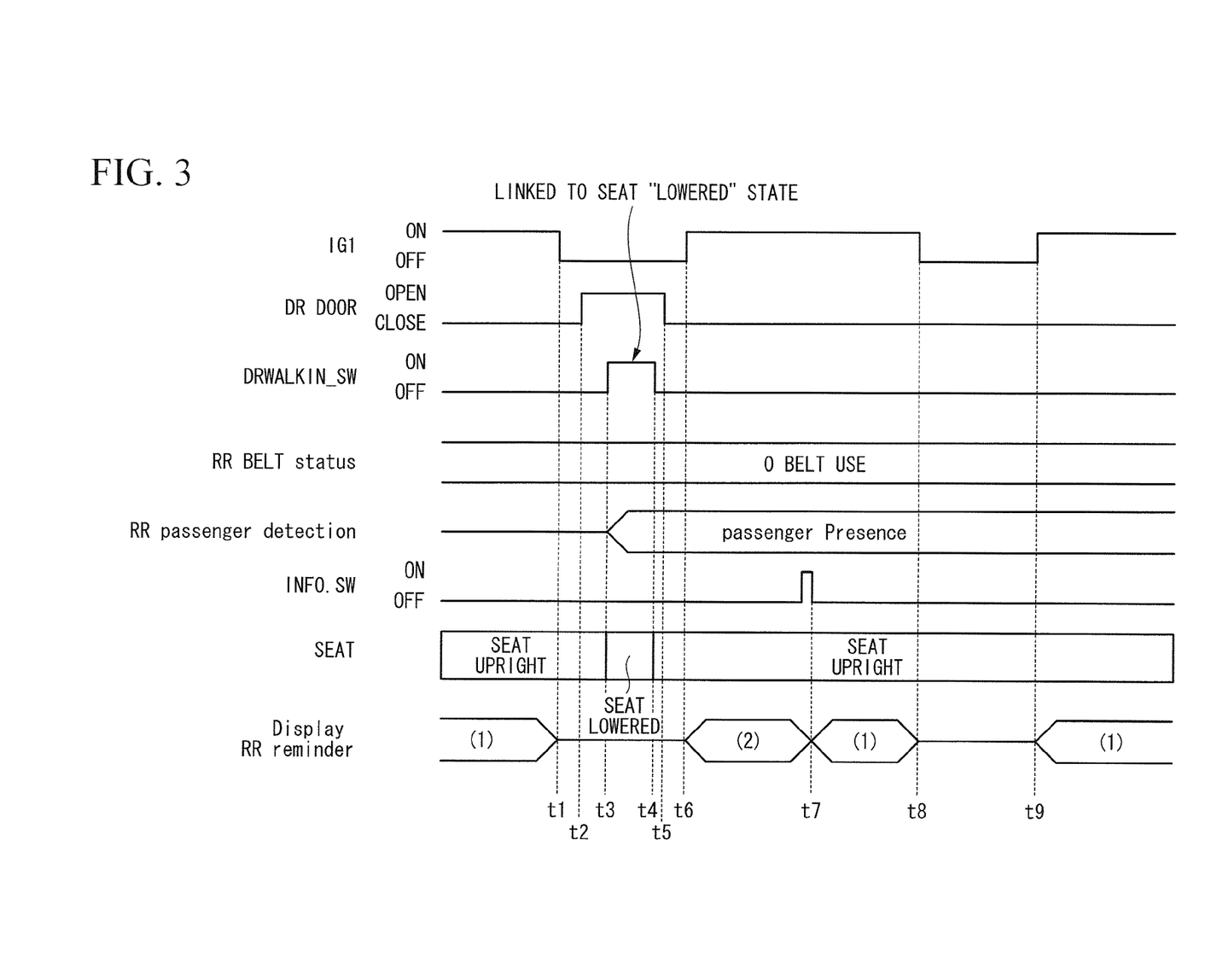
FIG. 3 is a timing chart for the rear seat passenger detection device.

Next, operations of the above-described rear seat passenger detection device 1 are explained, referring to the timing chart of FIG. 3. The timing chart shown in FIG. 3 is an example of a case in which a passenger boards and is seated in the rear seat from the driver's seat side.

First, the control unit 2 displays fuel mileage, ODO/TRIP and other basic information (display (1)) on the multi-information display 16 for the previous vehicle travel. Then, when the ignition (IGI) is switched from ON to OFF at time t1, power supply to the multi-information display 16 is stopped, and the display is extinguished. Here, even though the ignition is in the OFF state, power supply to the control unit 2 is maintained.

At time t2, the door on the driver's seat side is opened, and the door switch 11 is closed. Also, at time t3, the seatback 13 of the driver's seat is inclined forward and lowered from the upright state (SEAT UPRIGHT), so that the angle θ made by the seatback 13 and the seat cushion 14 becomes equal to or less than the predetermined angle (SEAT LOWERED), and the seat switch (DRWARKIN_SW) 10 is closed (ON); at this time the control unit 2 detects that a passenger has boarded in the rear seat on the driver's seat side (RR passenger detection). Thereafter, a flag (Passenger Presence) is set indicating that a passenger is seated in the rear seat. Then, at time t4 the seatback 13 is inclined and moved backward, so that the angle θ made by the seatback 13 and the seat cushion 14 becomes larger than the above-described predetermined angle. At time t5, even after the door on the driver's seat side is closed, the flag indicating that a passenger is seated in the rear seat is maintained.

When the ignition is switched from OFF to ON at time t6, the control unit 2 performs display control of the multi-information display 16 based on the state of the above-described flag. The rear seat information display (display (2)) 20 indicating that a passenger is seated in the rear seat is displayed. Here, in display (1) in FIG. 3, a normal display which is not the rear set information display 20 is shown; in display (2), as indicated by the example of FIG. 4, rear seat information display 20 is displayed. In FIG. 3, a case is shown in which the seat belt unfastened state (0 BELT USE) continues as the status (RR BELT status) of the driver's seat side rear seat belt status.

While the rear seat information display 20 is being displayed, when the display switch (INFO SW) 17 is operated (from OFF to ON, and then OFF) by a passenger at time t7, the rear seat information display 20 is switched to the normal display. Here, if the display switch 17 is not operated, after a predetermined time (for example, approximately 30 seconds) has elapsed the rear seat information display 20 is switched to the normal display.

Furthermore, when the ignition is switched from ON to OFF at time t8, the normal display which is being displayed on the multi-information display 16 is extinguished. At time t9, when the ignition is switched from OFF to ON, once again the normal display is displayed on the multi-information display 16.

Hence by means of the above embodiment, when both the seatback 13 of the front seat being inclined forward and lowered and of the angle θ becoming equal to or less than a predetermined angle, and the door to the front seat being opened, are detected, the boarding and seating in the rear seat of a passenger can be detected. With this configuration, increases in costs can be suppressed without using a seat sensor such as in the prior art, and boarding and seating of a passenger in the rear seat can be reliably detected, while preventing erroneous judgments.

Moreover, because the seat switch 10 and door switch 11 are connected in series, even when the inclination of the seatback 13 is maintained at less than or equal to the predetermined angle, if the door to the front seat is closed, then the door switch 11 is open. Hence increases in the dark current can be prevented.

Moreover, when the state of a door open and seatback 13 inclined so as to enable boarding and seating of a passenger in a rear seat is maintained for a predetermined time necessary to complete boarding, for example, then the fact of a passenger having boarded and been seated in the rear seat can be judged. Hence erroneous judgments can be further prevented.

Figure 8:
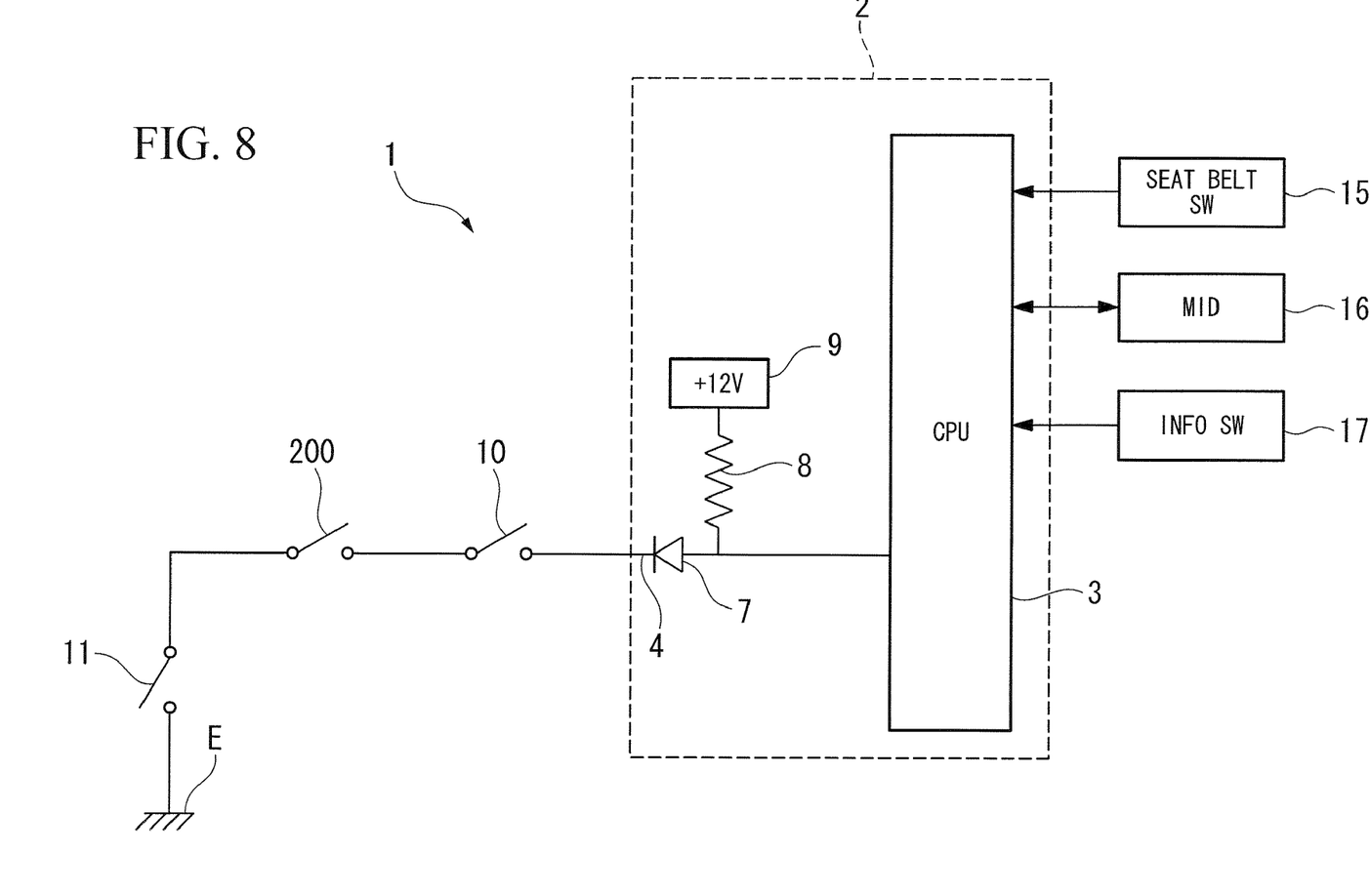
FIG. 8 is shows a schematic configuration diagram of the rear seat passenger detection device of another embodiment of the present invention.

As other embodiment of the above-described embodiment, as is shown is FIG. 8, a slide detection switch (third switch) 200 may be provided, the contact of which closes when for example a seat is slid in the vehicle forward direction to be positioned in front of a predetermined position. This switch 200 is connected in series with the seat switch 10 and the door switch 11 of the circuits for rear seat detection on both the driver's seat side and on the front passenger's seat side. By employing such a configuration, boarding of a passenger and seating in the rear seat is detected, on either the driver's seat side or on the front passenger's seat side, when all of the switches connected in series 10, 11, 200 are closed, that is, when the door is opened, the seatback 13 is inclined in the forward direction and lowered, and when moreover the front seat is slid in the front direction. Hence erroneous judgments can be further prevented.

Further, in place of the operation lever 12 which is used only in operations to incline the seatback 13 as explained in the above embodiment, for example, a walk-in lever may be used. By operating this walk-in lever when a passenger boards and is seated in the rear seat, the seatback 13 can be inclined and lowered, and moreover the seat can be slid in the front direction. By employing a configuration using this walk-in lever, the switch to detect inclination of the seatback and the switch to detect seat sliding can be integrated. Hence further cost reductions become possible, while preventing erroneous judgments.

Figure 7:
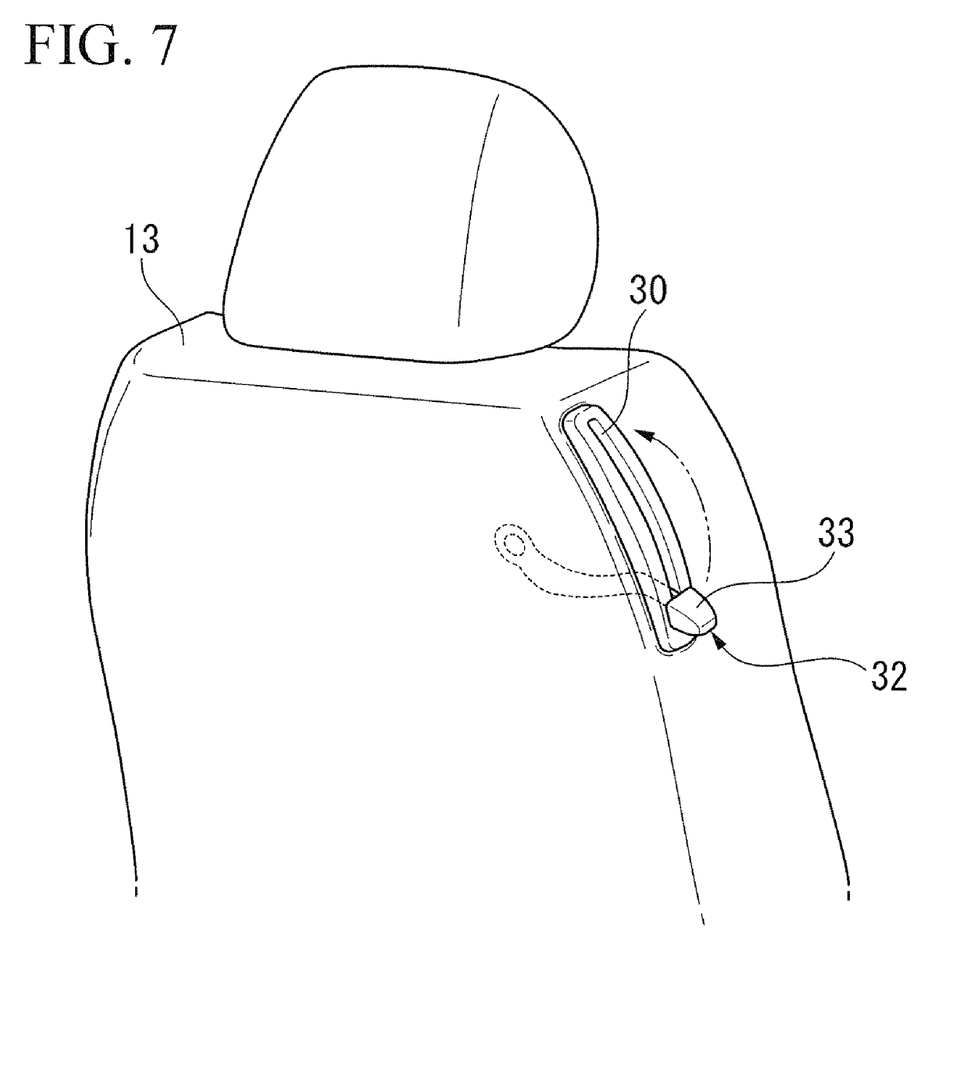
FIG. 7 is a perspective view of the lever in a modified example of the rear seat passenger detection device.

In the above-described embodiment, a case was explained in which the operation lever 12 is installed so as to be able to swing on the side of the seat cushion 14 (see FIG. 2); however, various modes for the lever can be adopted. For example, as the above-described operation lever 12 and the walk-in lever, a lever which can be operated in the vertical direction may be positioned on a side face of the seatback 13. FIG. 7 shows an example of a lever provided on a side face of the seatback 13. In this example, a long hole 30 is provided along the vertical direction in the side face of the seatback 13, and an operation portion 33 formed at the end portion of a lever 32 axially supported within the seatback 13 is exposed in the side direction of the seatback 13 through this long hole 30. By swinging the end portion of this lever upward or downward, seatback motion can be put into the locked state, or the locked state of forward-backward sliding movement of the front seat can be released.

In the above embodiment, a case was explained of series connection, in order from the input port 4 to the seat switch and the door switch; however, the order of series connection is not limited to the above order, but may be changed as appropriate.

In FIG. 4, a case was explained in which the seat belt status display is contained within the rear seat information display 20; however, the seat belt status display may be displayed separately in another location other than the multi-information display.

Further, in the above-described embodiment, rear seat passenger detection was explained for the driver's seat side; however, rear seat passenger detection on the front passenger's seat side, performed simultaneously with the rear seat passenger detection on the driver's seat side, is similar to the rear seat passenger detection on the driver's seat side.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A rear seat passenger detection device comprising:
   a first switch which closes a contact thereof when a front seat door is opened;
   a second switch which closes a contact thereof when a seatback of a front seat corresponding to the front seat door is inclined and lowered to an angle with respect to a seat face equal to or less than a predetermined angle; and
   a display device which is positioned in an instrument panel of a vehicle, and which displays a rear seat information indicating that a passenger is seated in a rear seat, wherein:
   the first switch is connected in series with the second switch; and
   a control device which performs a detection of the passenger boarding in the rear seat when the first switch and the second switch are closed, and which maintains a state of the detection even after the first switch and the second switch are opened and makes the display device display the rear seat information based on the state of the detection.

2. The rear seat passenger detection device according to claim 1, wherein the control device judges that the passenger has boarded in the rear seat when the first switch and the second switch are closed for a predetermined length of time or longer.

3. The rear seat passenger detection device according to claim 1, further comprising a third switch which closes a contact thereof when the front seat is displaced in a vehicle forward direction, wherein:
   the first switch, the second switch, and the third switch are connected in series; and
   the control device detects that the passenger has boarded in the rear seat when the first switch, the second switch, and the third switch are all closed.

* * * * *